United States Patent
Mian

(10) Patent No.: US 11,062,530 B2
(45) Date of Patent: Jul. 13, 2021

(54) TRANSPORTATION ASSET MANAGEMENT

(71) Applicant: International Electronic Machines Corp., Troy, NY (US)

(72) Inventor: Zahid F. Mian, Loudonville, NY (US)

(73) Assignee: International Electronic Machines Corp., Troy, NY (US)

( * ) Notice: Subject to any disclaimer, the term of this patent is extended or adjusted under 35 U.S.C. 154(b) by 55 days.

(21) Appl. No.: 16/168,328

(22) Filed: Oct. 23, 2018

(65) Prior Publication Data

US 2019/0122452 A1  Apr. 25, 2019

Related U.S. Application Data

(60) Provisional application No. 62/575,729, filed on Oct. 23, 2017.

(51) Int. Cl.

| | |
|---|---|
| *G06Q 10/00* | (2012.01) |
| *G06Q 30/00* | (2012.01) |
| *G07C 5/00* | (2006.01) |
| *G07C 5/08* | (2006.01) |
| *G06N 20/00* | (2019.01) |

(52) U.S. Cl.
CPC ............ *G07C 5/006* (2013.01); *G06N 20/00* (2019.01); *G06Q 10/20* (2013.01); *G07C 5/008* (2013.01); *G07C 5/0808* (2013.01)

(58) Field of Classification Search
None
See application file for complete search history.

(56) References Cited

U.S. PATENT DOCUMENTS

| | | | |
|---|---|---|---|
| 4,904,949 A | 2/1990 | Wilson | |
| 5,636,026 A | 6/1997 | Mian et al. | |
| 6,768,551 B2 | 7/2004 | Mian et al. | |
| 6,952,680 B1 * | 10/2005 | Melby | G06Q 10/04 |
| | | | 705/28 |

(Continued)

FOREIGN PATENT DOCUMENTS

| | | |
|---|---|---|
| JP | 4977064 B2 | 7/2012 |
| JP | 2013250599 A | 12/2013 |
| WO | 2019083980 A1 | 5/2019 |

OTHER PUBLICATIONS

Kang, M., International Search Report and written opinion for, PCTUS2018057074, dated Mar. 8, 2019.

*Primary Examiner* — Adam D Tissot
(74) *Attorney, Agent, or Firm* — LaBatt, LLC

(57) ABSTRACT

A transportation asset management solution is described. The transportation asset can be evaluated for operability. The evaluation can include periodic analysis of defect data acquired during operation of the transportation asset over a period of time. The evaluation can determine current operability of the transportation asset with respect to the defect and/or a future requirement for maintenance on the transportation asset due to the defect. One or more actions can be generated based on the analysis. A composite defect cost corresponding to the defect can be computed. The composite defect cost can include costs associated with one or more of: acquiring defect data during operation of the transportation asset, addressing the defect, a defect failure, and/or an error in identifying the defect. One or more aspects of the management solution can be periodically optimized to reduce the composite defect cost.

20 Claims, 8 Drawing Sheets

(56) References Cited

U.S. PATENT DOCUMENTS

| | | |
|---|---|---|
| 7,525,667 B2 | 4/2009 | Mian et al. |
| 7,564,569 B2 | 7/2009 | Mian et al. |
| 9,050,628 B2 | 6/2015 | Lautzenhiser et al. |
| 9,571,796 B2 | 2/2017 | Mian et al. |
| 2008/0082345 A1* | 4/2008 | Greiner .................. G06Q 10/06 705/305 |
| 2008/0082347 A1 | 4/2008 | Villalobos et al. |
| 2010/0036702 A1 | 2/2010 | Sitton |
| 2013/0198556 A1* | 8/2013 | Kolbet .................. G06Q 10/20 714/2 |
| 2014/0067666 A1 | 3/2014 | McClintic |
| 2017/0323274 A1* | 11/2017 | Johnson ............. G06Q 10/0635 |

* cited by examiner

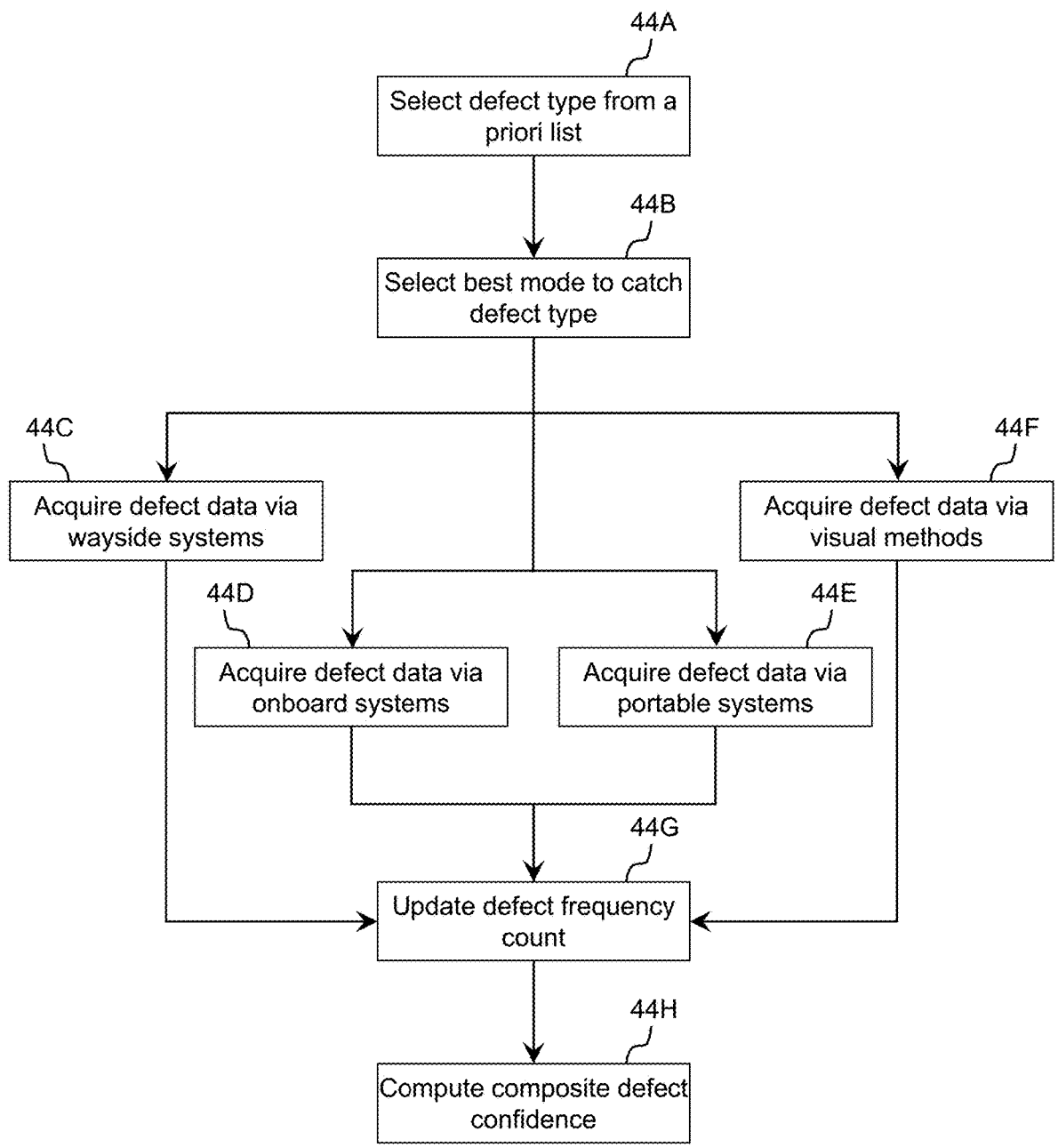

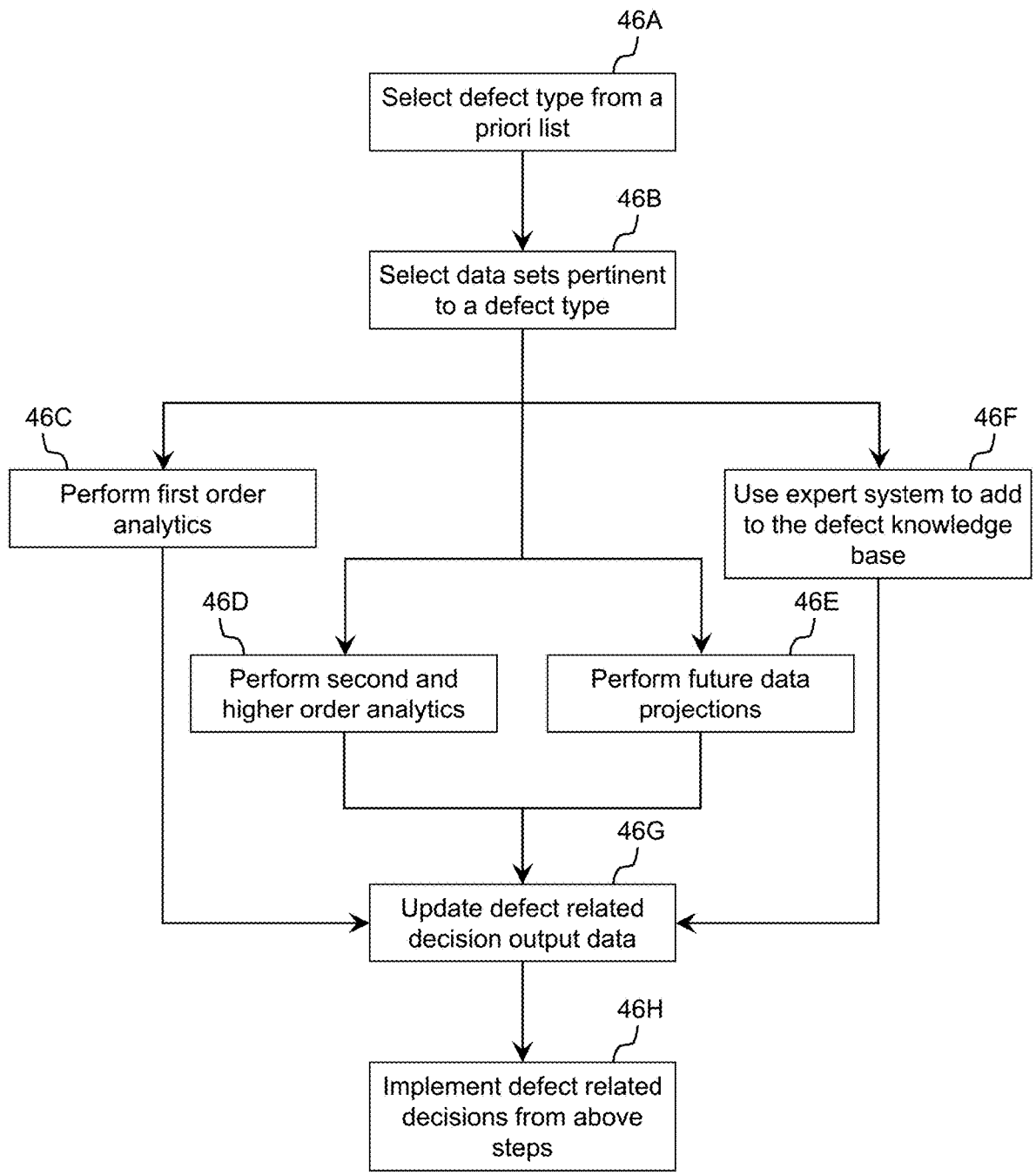

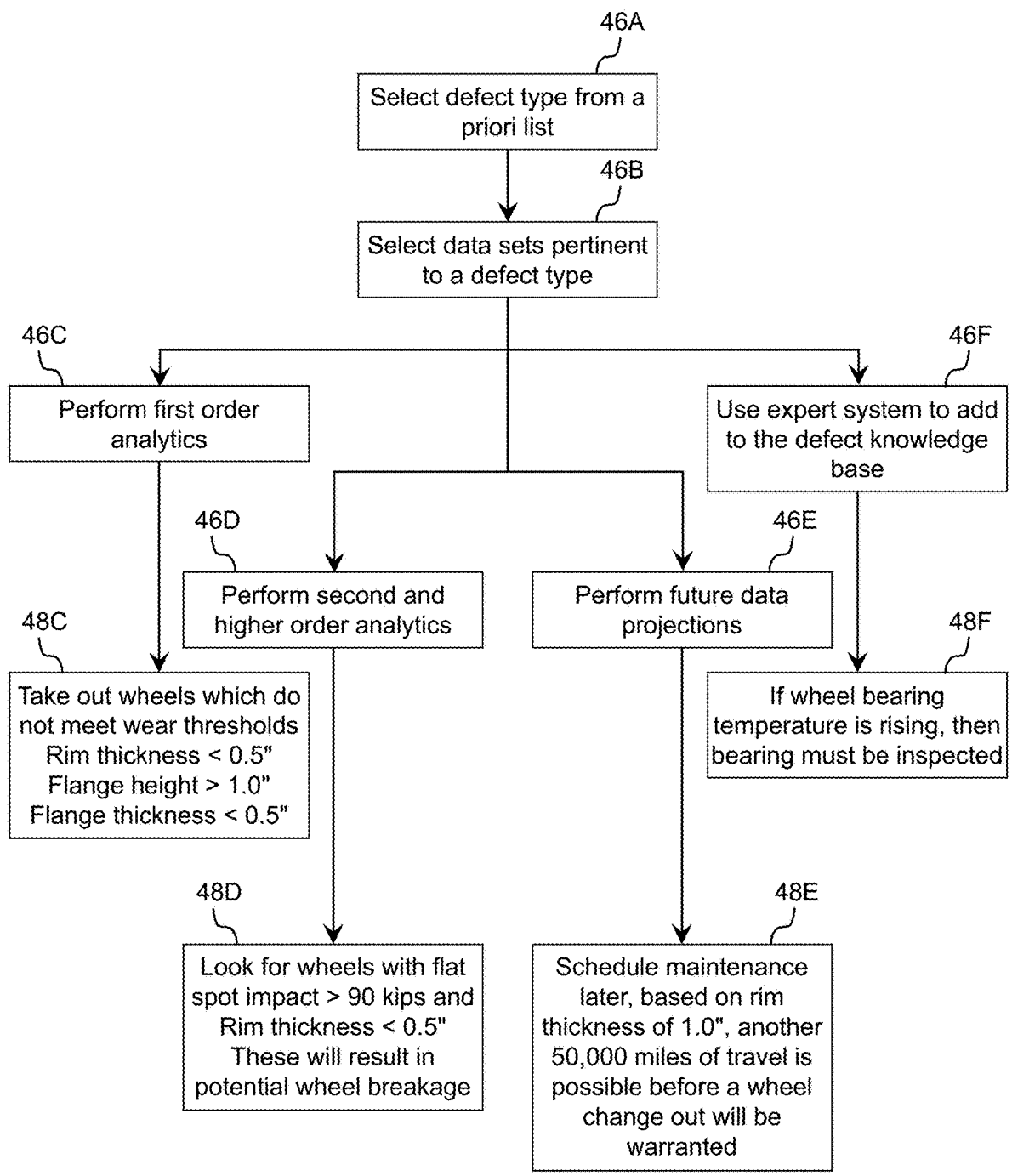

TRANSPORTATION ASSET MANAGEMENT

REFERENCE TO RELATED APPLICATIONS

The current application claims the benefit of U.S. Provisional Application No. 62/575,729, filed on 23 Oct. 2017, which is hereby incorporated by reference.

TECHNICAL FIELD

The disclosure relates generally to asset management, and more particularly, to using defect data to manage effectively assets.

BACKGROUND ART

Historically, transportation asset stakeholders use an asset monitoring infrastructure to keep the assets in good working condition. The asset monitoring infrastructure is either directly owned, directly leased/rented, indirectly owned or indirectly leased/rented. However, transportation asset stakeholders are routinely finding out that directly or indirectly owning and monitoring assets is expensive by virtue of upfront purchase costs, high operation costs, maintenance costs, etc. Furthermore, the transportation asset stakeholders are finding out that concentrating on non-core functions takes their focus away from their core business.

Numerous devices, systems, and methods are commonplace in the transportation industry which achieve various aspects of the transportation asset monitoring. For example, International Electronic Machines Corp. has previously described solutions for monitoring railway wheel features using wayside equipment in U.S. Pat. Nos. 5,636,026, 6,768,551, 7,564,569, and others. In addition, International Electronic Machines Corp. has described portable solutions for measuring railway wheels in U.S. Pat. Nos. 4,904,939, 7,525,667, 9,571,796, and others. Still further, International Electronic Machines Corp. describes on-board railway wheel measurement in U.S. Pat. No. 9,059,628, and others. Many other wayside, portable and on-board devices also exist in the industry. However, at present all of these solutions must be purchased by an asset stakeholder before benefiting from the solutions.

SUMMARY OF THE INVENTION

In view of the above, the inventor recognizes that more and more asset stakeholders desire an alternative solution to the historical asset monitoring approach.

An embodiment of the invention provides a solution to support the unique process by which a transportation operator, transportation asset owner, transportation component supplier, or other stakeholders associated with transportation infrastructure (collectively hereafter referred to as "stakeholder") keeps its transportation assets in good working condition without needing to invest significant capital in an asset monitoring system.

An embodiment can collect and fuse various types of data relating to a defect, thereby increasing a reliability of the analysis, enhance a confidence in a conclusion, and confirm a presence of an actual defect. An embodiment can project future defect data by using analytical models and use forecasting to increase early detection potential, schedule repairs, avoid costly repairs incurred if a defect incident occurs during network operation, etc. An embodiment can be performed by a service provider on the part of a stakeholder such that the stakeholder incurs reduced upfront costs and can be charged on an incident basis, an annual maintenance cost basis, and/or the like. In this case, the stakeholder can achieve one or more of the benefits described herein without having to own, operate, or maintain the monitoring assets and associated systems.

Aspects of the invention provide a transportation asset management solution. The transportation asset can be evaluated for operability. The evaluation can include periodic analysis of defect data acquired during operation of the transportation asset over a period of time. The evaluation can determine current operability of the transportation asset with respect to the defect and/or a future requirement for maintenance on the transportation asset due to the defect. One or more actions can be generated based on the analysis. A composite defect cost corresponding to the defect can be computed. The composite defect cost can include costs associated with one or more of: acquiring defect data during operation of the transportation asset, addressing the defect, a defect failure, and/or an error in identifying the defect. One or more aspects of the management solution can be periodically optimized to reduce the composite defect cost. The optimization process can enable management of a transportation asset without degrading to defect levels, management of a transportation asset for maximum potential/utilization, etc.

Embodiments of the invention described herein can provide one or more benefits associated with asset management, including but not limit to: increased asset life by reducing wear and reducing defects; improved safety by preventing accidents (e.g., derailments); higher utilization of assets; reduced unplanned maintenance; reduced regulatory compliance related fines; better fuel or electricity consumption (e.g., higher mileage); better capital expenditure planning; reduced labor costs to achieve higher and better quality asset monitoring effort; more efficient facility use by improving maintenance facility scheduling; advance detection of abnormal wear patterns to take corrective actions; reduced emissions from better operation of transportation assets; etc.

A first aspect of the invention provides a system for managing a plurality of transportation assets, the system comprising: a computer system including means for evaluating a transportation asset of the plurality of transportation assets, the means for evaluating including: computing a composite defect cost corresponding to a defect of the transportation asset, wherein the composite defect cost includes costs associated with each of: acquiring defect data during operation of the transportation asset, addressing the defect, a defect failure, and an error in identifying the defect; obtaining defect data acquired during operation of the transportation asset over a period of time; periodically analyzing the defect data to determine each of: current operability of the transportation asset with respect to the defect and a future requirement for maintenance on the transportation asset due to the defect; generating a set of actions for the transportation asset based on the analyzing; and periodically optimizing the analyzing to reduce the composite defect cost.

A second aspect of the invention provides a system for managing a plurality of transportation assets, the system comprising: an asset maintenance component, the asset maintenance component including a set of data acquisition devices configured to acquire defect data during operation of the plurality of transportation assets; a computer system including means for managing operation of the plurality of transportation assets, the means for managing including: computing, for each defect of a set of defects monitored for the plurality of transportation assets, a composite defect cost corresponding to the defect, wherein the composite defect cost includes costs associated with each of: acquiring defect data relating to the defect during operation of the plurality of transportation assets, addressing any instances of the defect, addressing any defect failure incidents, and processing any errors in identifying instances of the defect; periodically analyzing the defect data acquired by the asset maintenance component during operation of each of the plurality of transportation assets over a period of time to determine each of: current operability of each of the plurality of transportation assets with respect to the set of defects and a future requirement for maintenance on each of the plurality of transportation assets due to the defect; generating a set of actions for the plurality of transportation assets based on the analyzing; and periodically optimizing the system to reduce the composite defect cost, wherein the optimizing includes at least one of: reconfiguring the set of data acquisition devices; or adjusting a set of attributes of the analyzing, to reduce the composite defect cost and minimize a number of defect failure incidents.

A third aspect of the invention provides a system for managing a plurality of transportation assets for a stakeholder, the system comprising: an asset maintenance component, the asset maintenance component including a set of data acquisition devices configured to acquire defect data during operation of the plurality of transportation assets; a computer system including means for managing operation of the plurality of transportation assets, the means for managing including: means for evaluating the plurality of transportation assets during each operational day, the means for evaluating including: obtaining defect data acquired by the asset maintenance component during operation of the plurality of transportation assets; analyzing the defect data to determine each of: current operability of each of the plurality of transportation assets with respect to the set of defects and a future requirement for maintenance on each of the plurality of transportation assets due to the defect; and generating a set of actions for the plurality of transportation assets based on the analyzing; and means for optimizing the system after expiration of an optimization period, the means for optimizing including: computing, for each defect of a set of defects monitored for the plurality of transportation assets during the optimization period, a composite defect cost corresponding to the defect, wherein the composite defect cost includes costs associated with each of: acquiring defect data relating to the defect during operation of the plurality of transportation assets, addressing any instances of the defect, addressing any defect failure incidents, and processing any errors in identifying instances of the defect; and optimizing the system to reduce a combined cost of the composite defect costs for the set of defects, wherein the optimizing includes at least one of: reconfiguring the set of data acquisition devices; or adjusting a set of attributes of the analyzing, to reduce the combined cost and minimize a number of defect failure incidents.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIG. 4 shows an illustrative process for acquiring asset data for a corresponding defect according to an embodiment.

FIGS. 5A and 5B show illustrative processes for processing asset data for a corresponding defect according to embodiments, with FIG. 5B including illustrative evaluations and corresponding threshold numbers.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
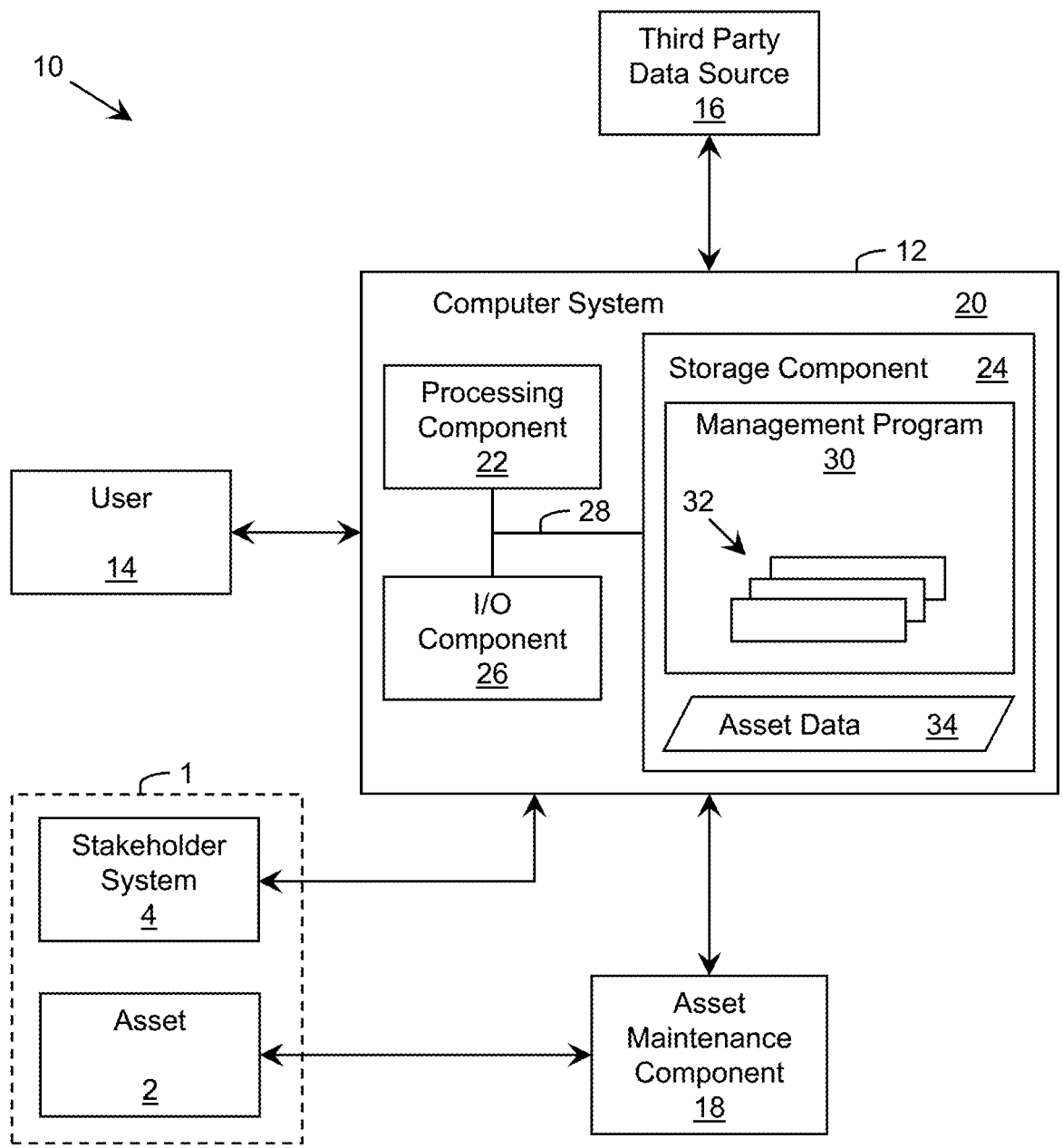
FIG. 1 shows an illustrative environment for managing assets according to an embodiment.

As indicated above, aspects of the invention provide a transportation asset management solution. The transportation asset can be evaluated for operability. The evaluation can include periodic analysis of defect data acquired during operation of the transportation asset over a period of time. The evaluation can determine current operability of the transportation asset with respect to the defect and/or a future requirement for maintenance on the transportation asset due to the defect. One or more actions can be generated based on the analysis. A composite defect cost corresponding to the defect can be computed. The composite defect cost can include costs associated with one or more of: acquiring defect data during operation of the transportation asset, addressing the defect, a defect failure, and/or an error in identifying the defect. One or more aspects of the management solution can be periodically optimized to reduce the composite defect cost.

An illustrative embodiment of the invention described herein can be directed to a railway transportation network and the corresponding rail transportation assets. However, it is understood that embodiments of the invention can be applied to other types of transportation networks and the corresponding transportation assets, e.g., tired vehicles, roadways, ships, pipelines, helicopters, airplanes, maglev trains, etc. Embodiments can provide one or more benefits including, but not limited to: increased asset life by reducing wear; improved safety by preventing accidents (e.g., derailments); higher utilization of assets; reduced unplanned maintenance; reduced regulatory compliance related fines; better fuel consumption (e.g., higher mileage); better capital expenditure planning; reduced labor costs to achieve higher and better quality asset monitoring effort; more efficient facility use by improving maintenance facility scheduling; advance detection of abnormal wear patterns to take corrective actions; reduced emissions from better operation of transportation assets; etc.

As used herein, an asset is any physical component owned and/or operated by a stakeholder. An asset can comprise an individual component (e.g., a rail wheel) or a collection of multiple individual components (e.g., a railcar). As used herein, a defect is an attribute (or a group of attributes) of an asset that indicates a need for the asset to undergo maintenance or be removed from service, e.g., an abnormal condition of the asset. To this extent, acquiring and/or analyzing defect data as described herein is inclusive of the acquisition and/or analysis of data corresponding to any combination of one or more attributes of the asset indicative of the operability of the asset. The analysis of the acquired defect data can, and often will, determine that the asset does not require maintenance or removal from service due to the underlying attribute(s). A defect failure occurs when the asset is being utilized and service is disrupted due to an unaddressed defect on the asset adversely affecting operation of the asset. For example, an illustrative rail wheel defect comprises a flange height above a maximum value. Such a defect can require the rail wheel to be removed from service and repaired or retired. An illustrative rail wheel defect failure comprises a derailment of a railcar caused by a rail wheel having a flange height above the maximum value.

In embodiments described herein, actions can be periodically performed. It is understood that any period can be used to determine when to next perform an action. For example, the period can be defined in terms of one or more operational days, one or more trips of an asset, a distance traveled by the asset, in response to one or more events, etc. The period used can be subject to optimization as described herein. As used herein, it is understood that optimization means modifying one or more attributes of an implementation of an embodiment to result in a more desirable outcome. For example, optimization can be performed to reduce a number of defect failures, reduce a composite defect cost, etc. Optimization does not necessarily mean that the end result is the best possible outcome except when all factors are considered in totality, e.g., global optimization is the goal.

Turning to the drawings, FIG. 1 shows an illustrative environment 10 for managing assets 2 according to an embodiment. To this extent, the environment 10 includes a management system 12 that can perform a process described herein in order to manage assets 2, which are owned and/or operated by a stakeholder 1. In an illustrative embodiment, the management system 12 is implemented as a computer system 20 including a management program 30, which makes the computer system 20 operable to manage the asset 2 using asset data 34 by performing a process described herein.

The computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, the processing component 22 executes program code, such as the imaging program 30, which is at least partially fixed in the storage component 24. While executing program code, the processing component 22 can process data, which can result in reading and/or writing transformed data from/to the storage component 24 and/or the I/O component 26 for further processing. The pathway 28 provides a communications link between each of the components in the computer system 20.

The I/O component 26 can comprise one or more human I/O devices, which enable a human user 14 to interact with the computer system 20 and/or one or more communications devices to enable a system user 14 to communicate with the computer system 20 using any type of communications link. To this extent, the management program 30 can manage a set of interfaces (e.g., graphical user interface(s), application program interface, and/or the like) that enable human and/or system users 14 to interact with the management program 30. Furthermore, the management program 30 can manage (e.g., store, retrieve, create, manipulate, organize, present, etc.) the data, such as the asset data 34, using any solution.

The management program 30 can be implemented using a set of modules 32. In this case, a module 32 can enable the computer system 20 to perform a set of tasks used by the management program 30, and can be separately developed and/or implemented apart from other portions of the management program 30. As used herein, the term "component" means any configuration of hardware, with or without software, which implements the functionality described in conjunction therewith using any solution, while the term "module" means program code that enables a computer system 20 to implement the actions described in conjunction therewith using any solution. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the management program 30 can be embodied as any combination of system software and/or application software.

The computer system 20 can comprise a single computing device, such as a general purpose computing article of manufacture (e.g., computing device) capable of executing program code, such as the management program 30, installed thereon. However, it is understood that a general purpose computing device executing the management program 30 is only representative of various possible equivalent computer systems that may perform a process described herein. To this extent, in other embodiments, the functionality provided by the management system 12 (e.g., the computer system 20 and the management program 30) can be at least partially implemented by one or more computing devices that include any combination of general and/or specific purpose hardware with or without program code. In each embodiment, the hardware and program code, if included, can be created using standard engineering and programming techniques, respectively.

In an embodiment, the computer system 20 comprises more than one computing device, each of which can comprise any of the various types of computing devices. In this case, a computing device can have only a portion of the management program 30 fixed thereon (e.g., one or more modules 32). Additionally, the computing devices can communicate with each other using one or more communications links. Furthermore, while performing a process described herein, the management system 12 can communicate with one or more other computer systems using one or more communications links. Each communications link can comprise any combination of various types of optical fiber, wired, wireless, etc., links; comprise any combination of one or more types of networks; utilize any combination of various types of transmission techniques and protocols; etc.

It is understood that two or more components, modules, and/or systems described herein may share some/all of their respective hardware and/or software. Furthermore, it is understood that some of the functionality discussed herein may not be implemented or additional functionality may be included in an embodiment of an environment 10.

As discussed herein, the management system 12 is configured to manage one or more assets 2 owned and/or operated by a stakeholder 1 using a process described herein. In an embodiment, the management system 12 and/or the asset maintenance component 18 (or a portion thereof) is owned by a service provider, which performs some or all of the asset management actions described herein on behalf of the stakeholder 1. In an alternative embodiment, the management system 12 and asset maintenance component 18 can be owned by the stakeholder 1 and the user 14 can be an employee of the stakeholder 1.

In an embodiment, the management system 12 can analyze the network (e.g., transportation network) of the stakeholder 1 to compute frequency and cost for each defect, defect data measurement, and/or defect related failure. The defect costs can be computed by using collection of actual network-based defect incidents, actual defect costs for the network defects, published historic defect costs as collected and computed by a third party data source 16, such as the Federal Railway Administration (FRA), Federal Motor Carrier (FMCSA), Federal Transit Administration (FTA), Federal Aviation Administration (FAA), etc., and other economic models. Historic defect cost data can be used as well as economic defect cost data.

Figure 2:
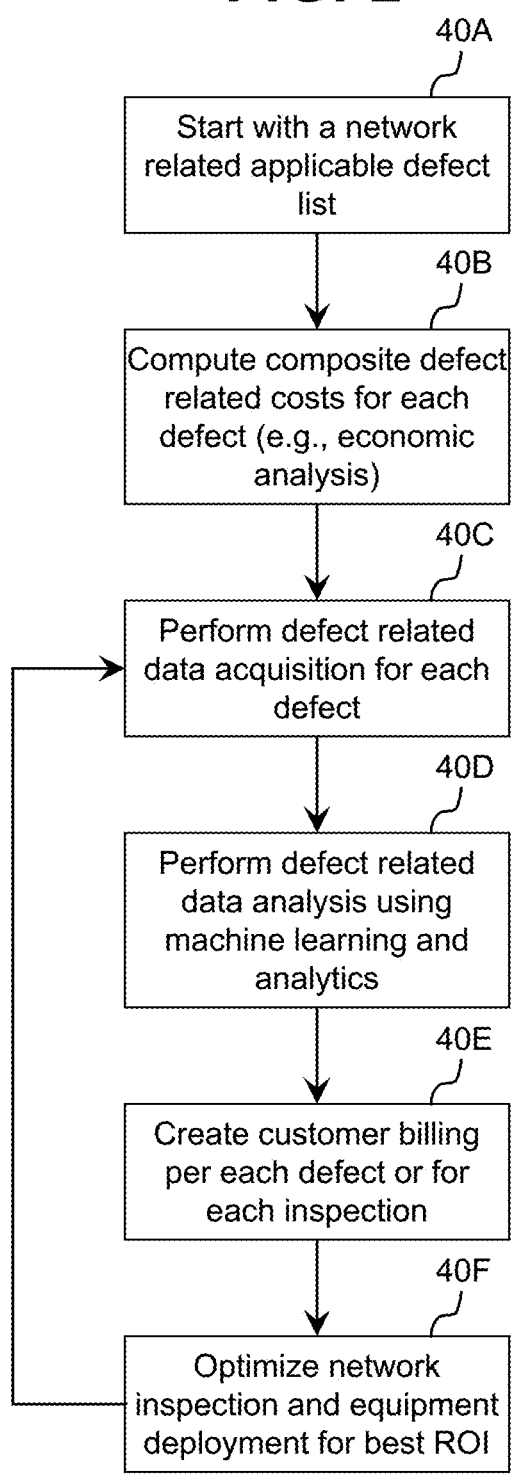
FIG. 2 shows an illustrative process for managing an asset according to an embodiment.

FIG. 2 shows an illustrative process for managing an asset 2, which can be implemented by the environment 10 (FIG. 1), according to an embodiment. Referring to FIGS. 1 and 2, in action 40A, the management system 12 can obtain (e.g., generate, modify, receive, and/or the like) a list of defects applicable to the asset 2 which must be monitored using an asset maintenance component 18.

For each defect, a set of attributes of the asset 2 can be monitored using the asset maintenance component 18. To this extent, the asset maintenance component 18 can include any combination of various devices and systems configured to acquire data regarding the corresponding attributes of the asset 2. Illustrative devices and systems applicable to the transportation industry are described in the various patents referenced in the background. However, it is understood that these devices and systems are only illustrative of various devices and systems suitable for use in conjunction with embodiments of the invention described herein.

Each defect also includes a set of defect-related failures. Failures can be of a variety of types. For example, for a railroad asset 2, a defect on a railway wheel can result in various failures including: derailment, increased noise, reduced operating speed, increased stopping time, increased vibration, increased stress on other components, reduced mileage, out of service time for the asset 2, etc. Each defect failure can have a cost associated therewith. For example, derailment can have an extremely high cost. The associated cost can vary based on one or more attributes of an operating environment. For example, rail operations in remote areas may not have any significant cost due to increased noise, but such operations in other areas (e.g., residential) may result in fines or penalties, e.g., due to the operator's failure to meet a noise restriction in an agreement.

In action 40B, the management system 12 can perform an economic analysis for each defect to compute a composite cost related to the defect. The economic analysis can consider: costs related to acquiring data regarding the attributes of the asset 2 corresponding to the defect, such as monitoring equipment costs and operation costs, installation costs, data transfer costs, and/or the like; costs related to errors in identifying the defect (e.g., false positives and false negatives); costs for addressing the defect, such as maintenance costs, replacement costs, and/or the like; costs related to defect-related failures; etc. As a result of the economic analysis, the management system 12 will have a monetary value associated with each defect to be monitored.

Subsequently, the management system 12 can begin monitoring the asset for the presence or non-presence of the defect(s). To this extent, in action 40C, the management system 12 can acquire defect-related data using the asset maintenance component 18. To this extent, during operation of the asset 2, one or more data acquisition devices of the asset maintenance component 18 can acquire data corresponding to various attributes of the asset 2. Such data can be acquired as the asset 2 is moving, after the asset 2 reaches a destination, when the asset is undergoing maintenance, and/or the like. Regardless, the asset maintenance component 18 can provide data corresponding to one or more attributes of the asset 2 (e.g., the raw acquired data, a calculated attribute value, pre-processed data, and/or the like) to the management system 12, which can store the data as asset data 34.

In action 40D, the management system 12 can perform defect-related data analysis on the asset data 34 to determine a current operability of the transportation asset with respect to the defect. Such analysis can determine one or more actionable decisions for the asset 2 based on each defect being monitored. The corresponding actions can include: allow continued operation of the asset 2 (e.g., no defect is present); limit operation of the asset 2; permanently or temporarily remove the asset 2 from operation; perform one or more maintenance operations on the asset 2; replace a component of the asset 2; schedule maintenance or replacement of the asset 2; etc. The management system 12 can analyze the asset data 34 and arrive at the corresponding actionable decision(s) using one or more of any of various analysis solutions. Such analysis solutions include machine learning, analytics, deep learning, pattern recognition, statistical processing techniques, and/or the like, for each defect being monitored.

In action 40E, the management system 12 can generate an invoice for the stakeholder 1 of the asset 2. In an embodiment, the invoice can be generated for each defect identified on the asset 2 and remedied using the management system 12. The invoice can account for all defect-related costs incurred in monitoring and addressing the defect. It is understood that the data acquisition and analysis relating to a defect can be performed continually, e.g., during each operational day for the asset(s). However, the invoice will generally only be generated after expiration of a predetermined time period, e.g., one month of operations.

In action 40F, the user 14 can evaluate deployment of the various devices of the asset maintenance component 18 to determine whether any improvements can be made to the overall asset 2 management system. For example, the management system 12 can use the asset data 34 to identify one or more assets 2 that may not be being monitored with sufficient frequency or is being monitored more than is required. Additionally, the management system 12 can identify one or more instances in which a defect failure occurred, which may have been prevented with improved monitoring. The user 14 can use such information to identify regions of a transportation route that are being insufficiently monitored, one or more types of defect-related data that are not being sufficiently acquired for the asset 2, locations and/or data that are being acquired more than is required, and/or the like. In response, the user 14 can adjust an existing configuration of the asset maintenance component 18, e.g., by: deploying new devices to a location; reconfiguring the locations of existing devices; increasing or decreasing a frequency of inspections at a given location; changing the types of inspections performed; adjusting maintenance periods for an asset 2; etc. Such adjustments by the user 14 can result in an improved return on investment for the service provider and/or the stakeholder 1.

It is understood that a minimal time period will generally be desired between adjustments of the system. For example, data acquired over an extended time period, such as three months, can be used to determine whether any adjustments are required. Such a longer time period can reduce an impact of sporadic event occurrences on the adjustments. However, it is understood that adjustments to the system also can be made in response to the occurrence of a significant defect failure incident or the occurrence of too many defect failure incidents, which may indicate a significant gap in the configuration of the system.

Figure 3:
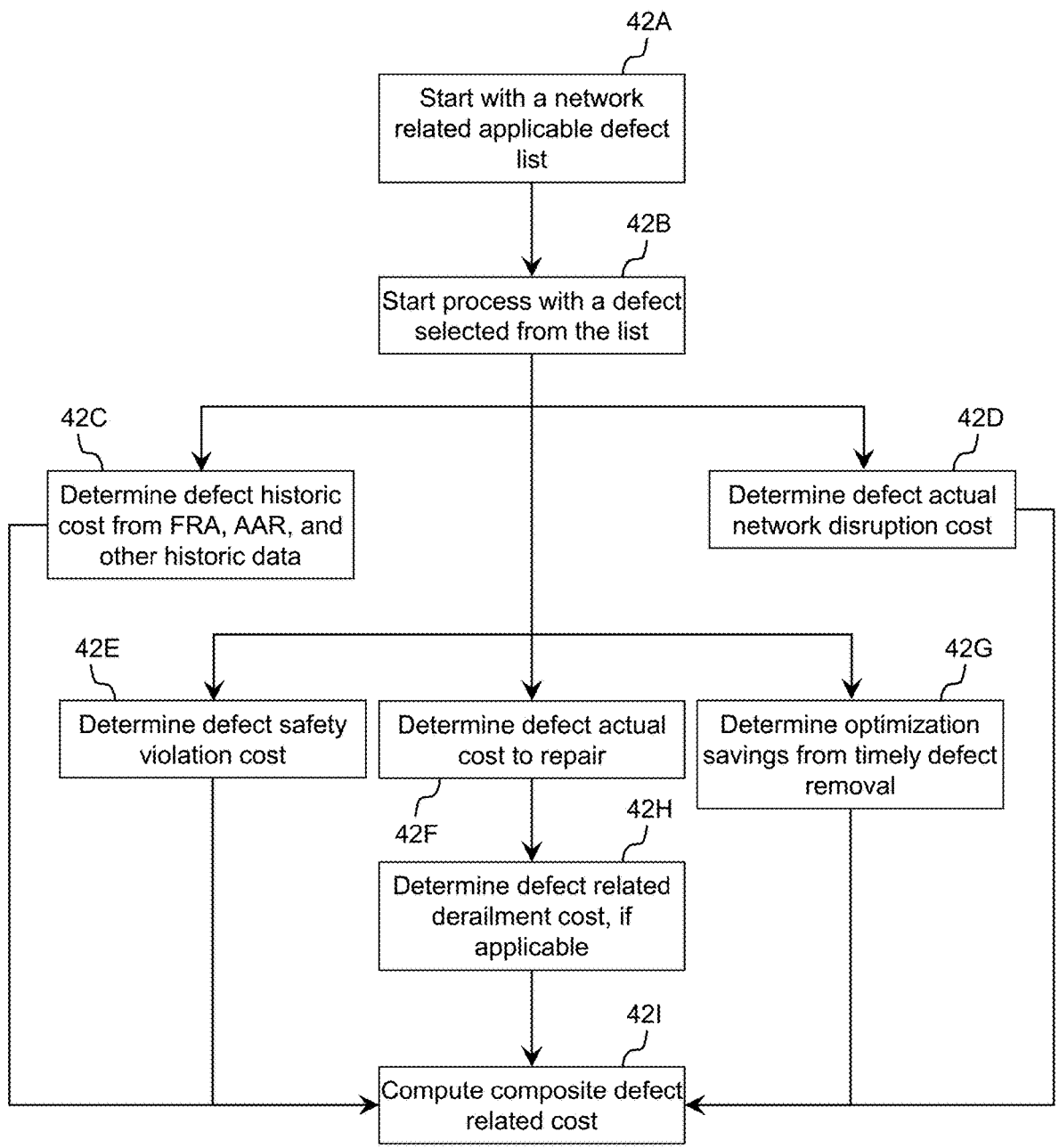
FIG. 3 shows an illustrative process for calculating defect related costs according to an embodiment.

As discussed in conjunction with action 40B, the management system 12 can compute defect related costs for each defect to be monitored. For example, the management system 12 can analyze a network to compute defect frequency, defect patterns, and defect costs, which can collectively define a defect economic model. FIG. 3 shows an illustrative process for calculating defect related costs, which can be implemented by the environment 10 (FIG. 1), according to an embodiment. Referring to FIGS. 1 and 3, in action 42A, the management system 12 can obtain the set of defects for the network. In action 42B, the management system 12 can select a defect from the set of defects using any solution. For example, the management system 12 can select a defect from a list of defects that has not been evaluated for a predetermined time period, a next defect on an ordered list of defects to be evaluated, and/or the like. While the process illustrates the processing for a single defect, it is understood that the process can be implemented for each defect in the set of defects. Furthermore, it is understood that multiple defect evaluations can be performed by the management system 12 in serial or in parallel.

In action 42C, the management system 12 can determine historic costs for the defect from one or more sources of information. For example, the management system 12 can acquire cost data from a stakeholder system 4. The stakeholder system 4 can include data regarding one or more occurrences of the defect (including defects identified and addressed as part of routine maintenance and defect failures) and the corresponding costs for the stakeholder 1 to address each occurrence of the defect. In an embodiment, the management system 12 can use only recent defect-related data, such as data in the last 1-2 years.

Additionally, the management system 12 can acquire data regarding the defect and the corresponding costs for addressing occurrence(s) of the defect from one or more third party data sources 16. In an embodiment, the third party data source 16 is one of: a government agency, an industry association, and/or the like. For example, when the asset is a railroad asset, illustrative third party data sources 16 include the Federal Railway Administration (FRA), the Association of American Railroads (AAR), and/or the like. Other transportation-related agencies include the Federal Aviation Administration (FAA), the Federal Transit Administration (FTA), the National Transportation Safety Board (NTSB), etc. However, it is understood that these entities are only illustrative of various third party data sources 16. To this extent, it is understood that numerous associations, trade groups, international, federal, state, and local government entities, universities, etc., exist which publish information relevant to different types of transportation. Regardless, in an embodiment, the data acquired from the third party data source 16 comprises published historic defect occurrences, costs corresponding to the defect occurrences, and/or the like, which are at least partially derived from collected and computed data from numerous entities and/or accepted economic models. In the absence of any accepted economic model, an embodiment can use only historic defect cost data.

In action 42D, the management system 12 can determine an actual disruption cost for an occurrence of a defect failure, e.g., on a transportation network. The management system 12 can use data acquired from the stakeholder system 4, e.g., when the stakeholder has records of addressing one or more previous occurrences of the defect failure. The management system 12 can use data acquired from the third party data source 16, such as industry data provided by one or more sources, which is based on a compilation of industry-wide data. For example, in the rail transportation environment, each time an overheated bearing is found (in a specific example of a railway asset network), the train must be stopped to verify the overheated bearing before being allowed to restart and continue to its destination. A commonly utilized disruption cost for the railway bearing example is estimated to be around $10,000.

In action 42E, the management system 12 can determine a safety violation cost that would be incurred for an occurrence of a defect failure. In an embodiment, such as a transportation environment, the cost of the violation may vary based on where the defect failure occurs and/or an actual impact that the defect failure has on other parties. To this extent, when a defect failure can incur different violation costs, the management system 12 can model the likelihood of the defect failure incurring each of the possible violation costs to determine the safety violation cost. Alternatively, the management system 12 can use the maximum possible safety violation cost, an average safety violation cost, and/or the like.

In action 42F, the management system 12 can determine an actual cost to repair an asset 2 due to an occurrence of the defect (as part of routine maintenance or as a result of a defect failure). The management system 12 can use data acquired from the stakeholder system 4, e.g., when the stakeholder has records of addressing one or more previous occurrences of the defect. The management system 12 can use data acquired from the third party data source 16 and/or the stakeholder system 4, such as pricing information for the required part(s) to repair the asset 2, labor costs for a time required to perform the repair, costs of transporting the asset 2 to a repair location, costs of replacing the asset 2 with another asset, and/or the like.

In action 42H, the management system 12 can determine a cost incurred when an occurrence of a defect failure causes a derailment. In this case, the derailment costs can include costs incurred due to: repair of the rail, removal/uprighting one or more railcars, damage to goods being transported, transfer of goods to another railcar, contract or legal penalties, etc.

In action 42G, the management system 12 can determine a savings incurred from timely identifying and addressing maintenance of a defect on an asset 2 prior to occurrence of a defect failure. For example, the management system 12 can determine the savings by combining the various costs that would be incurred due to an occurrence of the defect failure as described herein, reduced by the costs associated with performing the maintenance in a routine manner. Costs associated with regular maintenance can be lower than costs associated with performing similar maintenance after occurrence of a defect. For example, an asset 2 can be readily removed from service after completing a transportation route and being unloaded. However, when the same asset 2 needs to be removed from service prior to completion of the route, such removal may require goods to be transferred to a new asset, additional transport of the asset to a repair facility, use of a more expensive repair facility, urgent shipping of parts, etc.

Additionally, the management system 12 can determine the savings incurred by using an asset (or a component thereof) for close to its maximum operating life. In particular, by accurately and sufficiently monitoring operability of the asset over the course of its operating lifetime, the management system 12 will have accurate data regarding changes to one or more attributes of the asset 2 that can affect its operability. Using this data, the asset 2 can be removed from service at a time close to the maximum operating lifetime of the asset 2 (the optimal time), rather than at a predetermined safe use period which has a built in error margin. In this case, the savings can be calculated based on the period of actual, safe use of the asset 2 beyond the predetermined safe use period.

As used herein, the optimal time for removal of an asset 2 from service (e.g., for maintenance or permanent removal) occurs when the asset 2 is removed from service, after completion of a trip, at a scheduled time and service location when the projected additional service time (as measured in hours of operation, distance traveled, and/or the like) prior to the asset 2 developing a defect is less than the service time required for the asset 2 to remain in service and arrive at the next service location. As used herein, the asset 2 is removed from service at a time close to the optimal time when the projected additional service time for the asset 2 is less than three times the service time required for the asset to remain in service and arrive at the next service location. Using a railway wheel on a railcar as an example, removal of the railway wheel with a worn out wheel profile at an optimal time can correspond to removal of the railway wheel after the railcar has been unloaded at a railyard when the next scheduled trip for the railcar would result in the railway wheel traveling a distance to the next service location that exceeds a projected remaining operating life for the railway wheel. For the railway wheel, removal at the optimal time, or even close to the optimal time, can result in 7% to 10% extension in the useful life of the railway wheel. In other cases, removal of a defective railway truck suspension component at an optimal time can result in 15% or higher extension in the railway truck operating life.

In action 42I, the management system 12 can combine the results of the various costs and/or savings determined in actions 42C-42H relating to the defect to compute a composite defect related cost.

In each of the actions described herein, the management system 12 can use any solution for combining cost data from multiple sources and/or calculations. For example, the management system 12 can calculate an average, a weighted average, and/or the like, to determine a combined cost. To this extent, cost data obtained from the stakeholder system 4 can be weighted higher than cost data obtained from a third party data source 16. Furthermore, the management system 12 can determine a range of possible values for the combined cost. Such a range can include a high/low value, an expected value with maximum variations, etc.

As discussed herein, the management system 12 can use asset data 34 acquired by an asset maintenance component 18 to manage the asset 2, e.g., to prevent an occurrence of a defect failure during use of the asset 2. For example, the gathered data can be fused to arrive at better defect data, compute defect frequency, defect patterns, defect costs, and/or the like. In an embodiment, the asset maintenance component 18 collects actual defect occurrences using any combination of a variety of approaches including but not limited to visual defect information gathering, portable equipment, on-board equipment, and wayside equipment based defect data gathering. The data acquired by these different modalities can be combined to support defect data gathering by cross verification of data, support of multiple locations, transportation network organization, etc.

FIG. 4 shows an illustrative process for acquiring the asset data 34 for a corresponding defect, which can be implemented by the environment 10 (FIG. 1), according to an embodiment. In action 44A, the management system 12 selects a defect from the set of defects for evaluation using any solution.

In action 44B, the management system 12 can determine a best mode to identify the defect prior to a defect failure on the asset 2. To this extent, the management system 12 can develop a plan for monitoring the asset 2, including the locations (such as on a transportation network), a frequency of the data collection for the asset 2, one or more types of data acquisition components used to acquire the data, and/or the like.

The monitoring plan can include data acquisition from any combination of various types of data acquisition devices. For example, in action 44C, the asset maintenance component 18 can acquire defect data via one or more wayside systems. Such systems can be permanently installed adjacent to a path of travel for the asset and acquire data without impacting operation of the asset 2. In action 44D, the asset maintenance component 18 can acquire defect data via one or more onboard systems. Such systems can be permanently or temporarily installed on the asset 2 to acquire the defect data using any solution.

In action 44E, the asset maintenance component 18 can acquire defect data via one or more portable systems. Such portable systems can be periodically utilized in various locations, e.g., in a transportation network. Use of a portable system can enable the acquisition of defect data from numerous operating environments for the asset 2. In action 44F, the asset maintenance component 18 can acquire defect data via one or more visual methods. Such visual methods can include manual inspection by an individual using one or more data acquisition devices.

To this extent, as illustrated by actions 44C-44F, defect related data acquisition can occur at many different locations. For example, for a railway asset 2 defect data can be acquired as incoming railway traffic goes over a hump in a railyard, in a railway maintenance shop, at an optimal location within the railway mainline where most of the railway traffic is passing through, etc. Furthermore, various types of data acquisition equipment can be used to acquire the defect related data. These actions 44C-44F describe the different modalities of data acquisition which may apply to location, manner, speed of train movement, etc., pertinent to data acquisition relevant to the railway asset 2 example application.

The asset maintenance component 18 can correlate the defect data acquired from multiple data acquisition devices to arrive at a high confidence defect data. For example, when defect data acquired in one or more of the actions 44C-44F indicates a presence of a defect, in action 44G, the asset maintenance component 18 can update a defect frequency count for the defect. The frequency count can correspond to a number of times that defect data for an asset 2 indicates the presence of a defect. In action 44H, the asset maintenance component 18 can compute a composite defect confidence.

For example, when multiple types of data acquisition devices evaluate the asset 2 as having a defect, a relative confidence of the assessment increases. For example, in a railway, wheel data can be obtained by a mainline wayside system as well as a portable wheel measurement gauge. Once the wayside measurements are correlated and confirmed by using portable wheel measurement gauge, a confidence is assigned to the portable wheel measurement. Such confirmation may be stipulated by an entity. For example, in the US, industry standards by AAR may require that data is gathered by AAR approved portable devices, compared, fused, or correlated to arrive high confidence in defect measurement data.

The acquired defect data can be analyzed to detect actual defects, impending defects, potential future defects, first order defects, higher order defects, and/or other defect patterns, by performing analytics and machine learning on the data. To this extent, future impending defect failure incidents can be forecasted or projected by using the data collected from any combination of a variety of approaches, including but not limited to, visual defect information gathering, portable equipment, on-board equipment, and wayside equipment based defect data gathering. Data acquired by these different modalities can be combined to support forecasting of defect data by cross projection of data, projections based on failure progression (e.g. simple regression models), projections based on failure analytics models, projections to support multiple locations, transportation network organization, etc.

FIGS. 5A and 5B show illustrative processes for processing asset data for a corresponding defect, which can be implemented by the environment 10 (FIG. 1), according to embodiments. In particular, FIG. 5A shows an overview of the process according to an embodiment, while FIG. 5B shows a portion of the process with illustrative evaluations and corresponding threshold numbers included in example outputs for the various analysis actions to illustrate the concepts according to embodiments. In general, during operation, the asset maintenance component 18 can acquire a large amount of asset data 34 for an asset 2 and assets of a similar type. The asset data 34 can include data acquired using different acquisition approaches, at different locations, in different operating conditions, etc. Illustrative acquisition approaches can generate data from various different attributes of an operating asset 2 including imaging, sound recording, heat detection, vibration sensing, resonant signal data, etc. The asset data 34 also can include defect data for multiple defects being monitored by the environment 10.

In action 46A, the management system 12 selects a defect from the set of defects for evaluation using any solution. In action 46B, the management system 12 can select the data set(s) in the asset data 34 that are pertinent to the defect being evaluated. For different defects, data corresponding to multiple types of attributes of the operating asset 2 may be relevant to identifying the defect. The management system 12 can process data acquired for multiple assets 2 of the same type, which can enable the management system 12 to identify defects in asset(s) 2 through variation in one or more operating attributes from the other assets 2 operating in a similar manner under similar conditions.

The management system 12 can use any combination of various types of analytics to reduce the data to results, knowledge, and actionable tasks to be carried out on the asset 2. To this extent, in action 46C, the management system 12 can perform first order analytics on at least some of the selected data. First order analysis can include, for example, identifying data points outside of a predetermined threshold. For example, as illustrated in action 48C, the management system 12 can compute rail wheel dimensions from image data acquired therefore and flag rail wheels having a rim thickness, flange height, wheel diameter, and/or flange thickness outside of a given acceptable range of values for removal from operation. In an embodiment, the management system 12 can use first order analysis to identify anomalous data, which can be flagged and removed from consideration using any further analytics. Such analysis can include identifying data for which the data points are outside of any possible range of values, which can indicate a problem with the measurement (e.g., due to transitory environmental conditions) and/or measurement equipment.

In action 46D, the management system 12 can perform second and higher order analytics on at least some of the selected data. For example, as illustrated in action 48D, the management system 12 can use multiple types of data acquired for an asset 2 to identify a potential defect. To this extent, using the rail wheel for illustration, a rail wheel can be flagged for removal when a flat spot impact generates a force exceeding a predetermined threshold and a rim thickness is less than a predetermined threshold, a combination of which can result in potential wheel breakage.

In action 46E, the management system 12 can perform future data projections for one or more attributes of an asset 2. Such future data projections can include, for example, an estimated amount of use left before the asset 2 will require maintenance or removal from service due to a defect. Such an estimate can be generated from known current attributes of the asset 2, a history of wear on the asset 2, a history of wear for a group of assets of the same type, etc. The future projections can be used to schedule various actions, such as maintenance scheduling, repair parts ordering, etc. For example, as illustrated in action 48E, for the rail wheel, when a rim thickness goes below a predetermined threshold, an amount of continued use for the rail wheel can be calculated based on a history of the rim thickness changes, the current thickness, and a thickness at which point the rail wheel will require maintenance. The amount of continued use can be used to ensure that the rail wheel is scheduled for maintenance and/or replacement prior to exceeding its usable life. When maintenance is performed, highly accurate measurements of the rail wheel can be made, e.g., in a maintenance facility, which the management system 12 can use to improve the analysis generating the usable life projections, if necessary.

In action 46F, the management system 12 can use one or more expert systems to add to a defect knowledge base. For example, the expert system can evaluate defect data for an asset 2 to identify anomalous changes from other comparable assets. To this extent, as illustrated in action 48F, the expert system can identify a wheel bearing temperature that is rising in a manner anomalous to other wheel bearings, and can schedule an inspection of the wheel bearing for possible repair or removal from service.

In action 46G, the management system 12 can update the defect related decision output data generated from all of the processing performed on the data. For example, updated data can be stored as asset data 34 for each asset 2. Additionally, the management system 12 can update asset data 34 stored for numerous assets of the same type (e.g., all rail wheels in a transportation network) and defined subsets thereof (e.g., all rail wheels on a given railcar). In action 46H, the management system 12 can implement defect related decisions. For example, the management system 12 can schedule one or more assets 2 for immediate repair or removal, future maintenance, future removal, and/or the like, which can be provided to maintenance personnel via the asset maintenance component 18 and/or to the stakeholder 1, e.g., by providing data corresponding to the required actions to the stakeholder system 4.

As described herein, an embodiment of the environment 10 can be implemented by a service provider performing asset management actions on behalf of a stakeholder 1. By performing such actions on behalf of numerous stakeholders, such a service provider can leverage a larger amount of data to generate projections having an increased accuracy, can use portable and handheld data acquisition equipment and maintenance personnel more efficiently, etc. Such improved accuracy and increased efficiency can result in a significant cost savings for the stakeholder 1.

Figure 6:
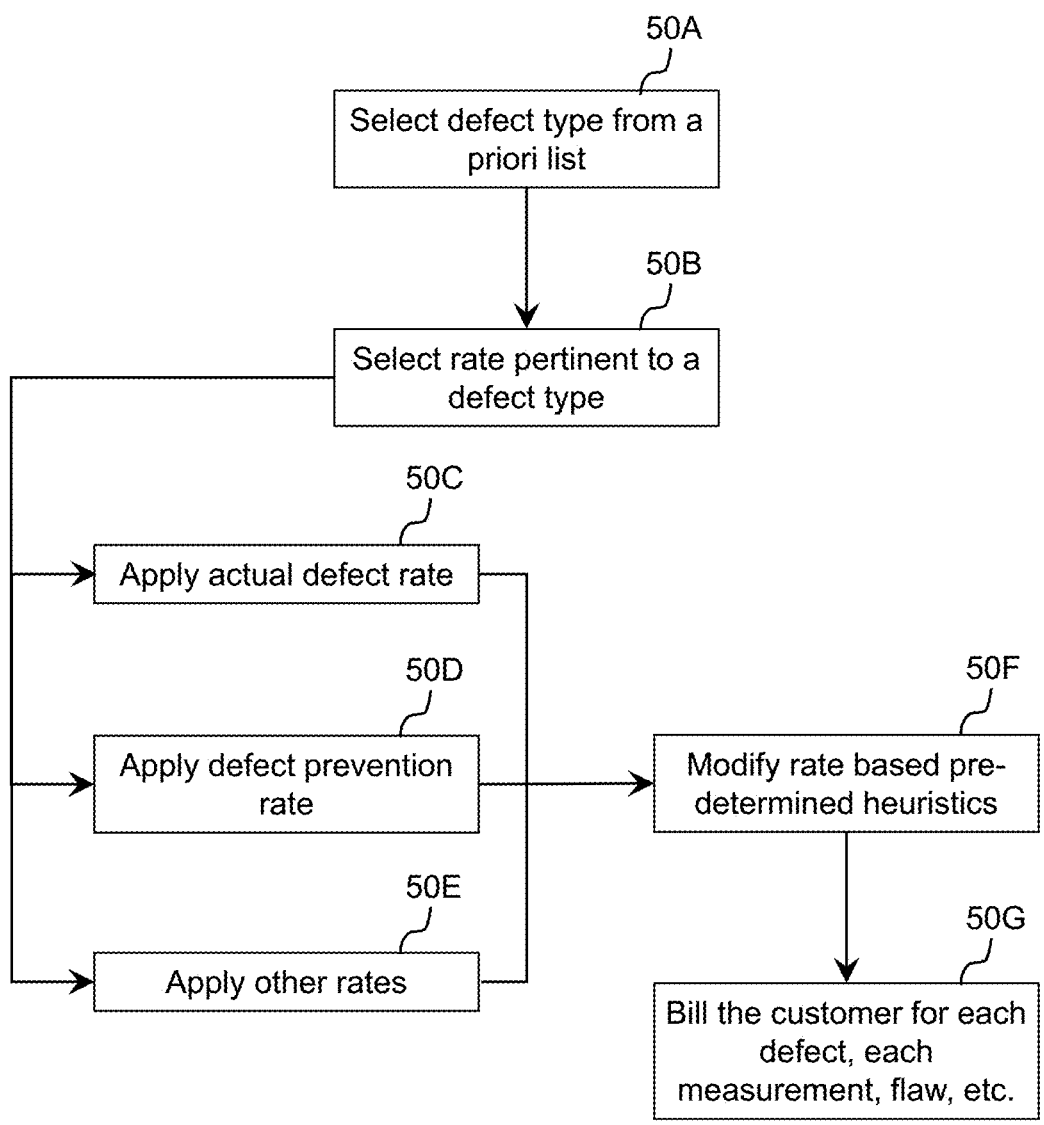
FIG. 6 shows an illustrative process for a service provider to charge a customer for maintaining an asset according to an embodiment.

FIG. 6 shows an illustrative process for a service provider to charge a customer for maintaining an asset 2, which can be implemented by the environment 10 (FIG. 1), according to an embodiment. Charges from the service provider can be based on actual and/or impending defects identified by the environment 10. For example, the charges can include charges for one or more of: the detection of actual defects; the detection of potential upcoming defects; identification of potential future repairs to avoid defect failure incidents (schedule for maintenance); and a projection of compound defects discoverable from higher order defect analytics, such as analytics-based (e.g. pattern recognition or other machine learning) defect discovery (e.g. discovering a large defective wheel population from a certain supplier).

In action 50A, the management system 12 selects a defect from the set of defects for evaluation using any solution. In action 50B, the management system 12 can select a set of rates that are pertinent to the defect being evaluated. As illustrated in actions 50C-50E, the set of rates can include numerous rates, each of which corresponds to a different action performed during the period by the service provider.

For example, in action 50C, the management system 12 can apply a rate for addressing defect occurrences for the asset(s) 2 of the stakeholder 1. For example, for a railcar asset 2, the defect occurrences can comprise addressing problems with one or more of: the rail wheels, bearings, brakes, railway truck, etc. In an embodiment, the multiple rates can be utilized, such as when maintenance is performed prior to the defect creating a disruption to the overall transportation operations of the stakeholder 1 versus addressing a defect in response to a defect failure occurring during use of the asset 2. Additionally, in an embodiment, the rate can vary based on how close to the maximum usable life the maintenance was performed on the asset 2. For example, when the service provider performs the maintenance after the asset 2 exceeded 90% of its usable life, a higher rate can be used than when the service provider performs the maintenance after the asset 2 has been used for less than 90% of its usable life.

In action 50D, the management system 12 can apply a rate for preventing defect(s) from impacting the transportation operations of the stakeholder 1. For example, the rate can be configured to incentivize the service provider in reducing the occurrences of defect failure-related disruptions over a number of such occurrences historically experienced by the stakeholder 1, experienced by the industry, a predetermined agreed to acceptable amount (including zero), etc. In response to the service provider successfully reducing adverse impacts for the stakeholder 1, the service provider can charge the stakeholder 1 a rate based on the reduced adverse impacts. In this manner, the service provider can share in the cost savings that efficient management of the asset 2 provides to the stakeholder 1. Similarly, the rate can reduce the compensation provided to the service provider when the number of adverse events exceed that experienced by the industry, historically by the stakeholder 1, agreed upon, and/or the like.

It is understood that these rates are only illustrative of various rates that can be applied for different results of the management. To this extent, in action 50E, the management system 12 can apply one or more additional rates based on the occurrence/non-occurrence of defects and/or defect failures over a given time period of asset management performed by the service provider.

In action 50F, one or more of the rates can be adjusted up or down based on predetermined heuristics. For example, the rates can modified based on pre-established heuristics, e.g. discount rates, severity premium, defect false positive credit, etc. To this extent, a discount rate may apply when the stakeholder 1 has a large volume of assets 2 to be managed, utilizes the service provider for multiple aspects of the asset management (e.g., monitoring and maintenance), etc. Additionally, the service provider can provide a credit to the stakeholder 1 when a severe disruption occurs due to a monitored defect not being identified and addressed in a timely manner or due to false positives that caused a disruption to the operations of the stakeholder 1. Once complete, in action 50G, the management system 12 can generate an invoice which can be provided to the stakeholder 1. The invoice can include an itemized list of the various actions taken for each defect being monitored and how the corresponding charges were calculated.

Figure 7:
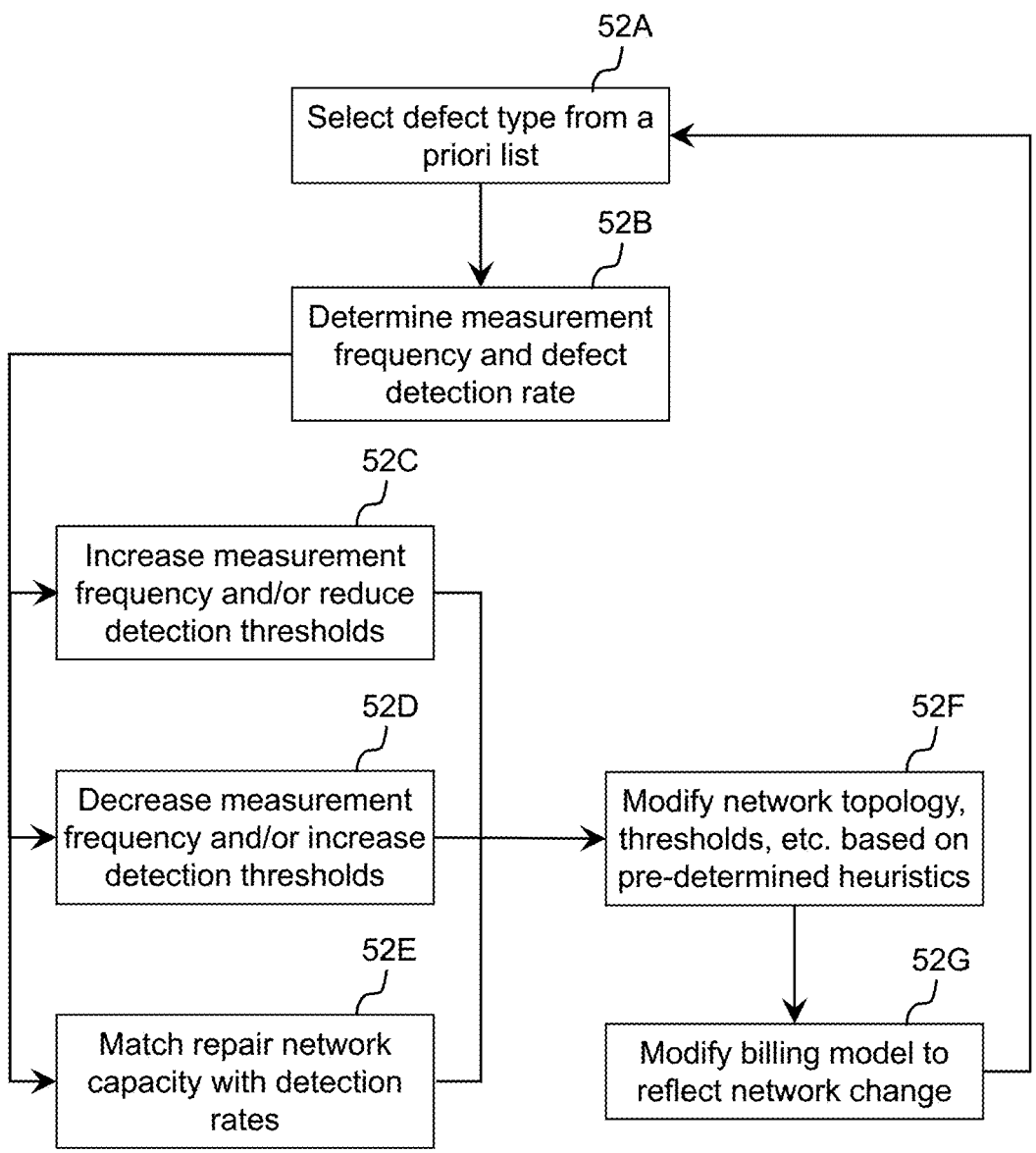
FIG. 7 shows an illustrative process for optimizing management of an asset used in a network according to an embodiment.

As described herein, a service provider can be incentivized to perform asset management in a manner that maximizes the use of the asset 2 while minimizing disruptions to the operations of the stakeholder 1. Similarly, when the management is performed by the stakeholder 1, the stakeholder 1 has an incentive to maximize the use of an asset 2 while minimizing disruptions due to occurrences of defect failures of the asset 2. In an embodiment, the environment 10 (e.g., monitoring equipment installation and utilization, analysis thresholds, etc.) can be iteratively optimized to gain an ideal network-wide deployment and/or optimized monitoring equipment deployment count. Such configurations can provide an improved return on investment, detectability, capacity matching, network performance, and/or the like, for the stakeholder 1. Such optimization can occur, for example, after any optimization period. For example, the environment 10 can be optimized after a predetermined number of operational days (e.g., 90 days). Alternatively, the environment 10 can be optimized in response to the occurrence of an unacceptable number of defect failure incidents (e.g., a single derailment). To this extent, FIG. 7 shows an illustrative process for optimizing management of an asset 2 used in a network, which can be implemented by the environment 10 (FIG. 1), according to an embodiment. In action 52A, the management system 12 selects a defect from the set of defects for evaluation using any solution.

In action 52B, the management system 12 can determine an existing measurement frequency and defect detection rate for the defect being evaluated. In an embodiment, the measurement frequency can be calculated based on a metric defining a quantity of use of the asset 2, such as a distance traveled by a transportation asset 2, rather than an amount of time between measurements. The measurement frequency can be a range of frequencies defined by the highest and lowest frequencies, an average frequency, and/or the like. The defect detection rate can be calculated for any relevant time period. For example, the defect detection rate can be determined for only a time period corresponding to commencement of the monitoring using a particular configuration of data acquisition devices in a network, or for only a most recent subset of such a time period. Based on the defect detection rate, the management system 12 can make one or more modifications to the configuration of the asset maintenance component 18.

For example, when the defect detection rate is too low, the management system 12 can make one or more adjustments to the measurement frequency and/or analysis. In this case, the management system 12 can determine that an attribute is being insufficiently monitored based on differences in the wear data for the asset 2 between data acquisitions. Additionally, the management system 12 can determine that an attribute is not commonly factoring into a determination of a defect, for which defect failures are occurring at too high of a frequency and/or is being timely identified by other attribute data. Regardless, in action 52C, the management system 12 can increase a frequency of one or more types of measurement and/or reduce one or more thresholds for flagging an asset 2 for maintenance or replacement due to the corresponding defect. The frequency can be adjusted by, for example, increasing a frequency of use of handheld or temporary installments of data acquisition devices of the asset maintenance component 18, moving a location at which a data acquisition device is utilized (e.g., to a more commonly utilized route), etc.

Similarly, when the defect detection rate is sufficiently high, the management system 12 can determine whether to make one or more adjustments to the measurement frequency and/or analysis. Additionally, the management system 12 can determine that an attribute is making a false positive determination of an occurrence of a defect, which is causing the asset 2 to be scheduled for maintenance too early and/or is being nullified by other attribute data which indicates that the defect is not present. Furthermore, the management system 12 can determine that an attribute is being monitored much more closely than the wear data indicates is necessary. Regardless, in action 52D, the management system 12 can decrease a frequency of one or more types of measurement and/or increase one or more thresholds for flagging an asset 2 for maintenance or replacement. The frequency can be adjusted by, for example, reducing a frequency of use of handheld or temporary installments of data acquisition devices of the asset maintenance component 18, moving a location at which a data acquisition device is utilized, etc.

In action 52E, the management system 12 can make one or more adjustments to a repair network capacity for the asset maintenance component 18 based on the defect detection rates. For example, when a particular defect is being identified at a higher than anticipated rate, the management system 12 can allocate additional assets (e.g., personnel, parts, tools, etc.) of the asset maintenance component 18 for addressing the defect. Similarly, when a particular defect is being identified at a lower than anticipated rate, the management system 12 can allocate fewer assets of the asset maintenance component 18 to address the defect. Due to a possibility of many assets of a particular type being introduced at a same time and used together, such as the rail wheels of a rail car, such adjustments may need to be made continually.

Conversely, when a bottleneck is identified in one or more maintenance/repair assets of the asset maintenance component 18, the management system 12 can adjust one or more settings to reduce a detection rate of non-critical defects. For example, an asset 2 may require periodic scheduled maintenance, which can be extended to a slightly longer duration to allow a bottleneck in such maintenance to subside. Similarly, a defect that is not a risk for causing any immediate disruption to the operations of the stakeholder 1 can be allowed to persist for a certain time period until the defect becomes more severe or the bottleneck subsides.

In action 52F, the management system 12 can modify a topology for the network, the thresholds, etc., based on pre-determined heuristics. To this extent, the management system 12 can adjust the settings for one or more of the analyses performed on the data. Furthermore, the management system 12 can provide a set of recommendations to the user 14 for reconfiguring one or more operational attributes of the asset maintenance component 18, e.g., by relocating assets, adjusting a frequency of use of the assets, etc. It is understood that when the same device(s) are used to acquire defect data for multiple defects, any modifications to the corresponding device(s) can consider all of the defects for which the device is utilized to acquire defect data. To this extent, the actual modification may correspond to the defect requiring the highest frequency for proper monitoring.

Regardless, as the environment 10 is optimized for a given usage of a network, fewer occurrences of defects should be identified over time. However, when use of the network changes significantly, e.g., the overall usage increases, the number of defect occurrences can significantly change. In action 52G, the management system 12 can modify a billing model used by a service provider to reflect a significant change to the network so that higher or lower invoices are generated accordingly.

While shown and described herein as a method and system for managing assets, it is understood that aspects of the invention further provide various alternative embodiments. For example, in one embodiment, the invention provides a computer program fixed in at least one computer-readable medium, which when executed, enables a computer system to manage an asset 2. To this extent, the computer-readable medium includes program code, such as the management program 30 (FIG. 1), which enables a computer system to implement some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; and/or the like.

In another embodiment, the invention provides a method of providing a copy of program code, such as the management program 30 (FIG. 1), which enables a computer system to implement some or all of a process described herein. In this case, a computer system can process a copy of the program code to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of the program code, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for managing an asset 2. In this case, the generating can include configuring an environment, including a computer system, such as the computer system 20 (FIG. 1), and/or an asset maintenance component 18 (FIG. 1), to implement a method of managing an asset as described herein. The configuring can include obtaining (e.g., creating, maintaining, purchasing, modifying, using, making available, etc.) one or more hardware components, with or without one or more software modules, and setting up the components and/or modules to implement a process described herein. Additionally, the configuring can include adjusting a location of, use of, an amount of, and/or the like, one or more human and/or device resources of the asset maintenance component 18 described herein. To this extent, the configuring can include deploying one or more components to the computer system, which can comprise one or more of: (1) installing program code on a computing device; (2) adding one or more computing and/or I/O devices to the computer system; (3) incorporating and/or modifying the computer system to enable it to perform a process described herein; and/or the like.

As used herein, unless otherwise noted, the term "set" means one or more (i.e., at least one) and the phrase "any solution" means any now known or later developed solution. The singular forms "a," "an," and "the" include the plural forms as well, unless the context clearly indicates otherwise. Additionally, the terms "comprises," "includes," "has," and related forms of each, when used in this specification, specify the presence of stated features, but do not preclude the presence or addition of one or more other features and/or groups thereof.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system for managing a plurality of transportation assets, the system comprising:
    a computer system for evaluating a transportation asset of the plurality of transportation assets, the evaluating including:
        computing a composite defect cost corresponding to a defect of the transportation asset, wherein the composite defect cost includes a combination of costs incurred by each of: acquiring defect data during operation of the transportation asset apart from costs of operating the transportation asset, addressing the defect, a defect failure, and an error in identifying the defect;
        obtaining defect data acquired during operation of the transportation asset over a period of time;
        periodically analyzing the defect data to determine each of: current operability of the transportation asset with respect to the defect and a future requirement for maintenance on the transportation asset due to the defect;
        generating a set of actions for the transportation asset based on the analyzing; and
        periodically optimizing the analyzing to reduce the composite defect cost, wherein the optimizing includes evaluating at least one attribute of the analyzing for adjustment to increase an accuracy of at least one of: the current operability of the transportation asset with respect to the defect or the future requirement for maintenance on the transportation asset due to the defect.

2. The system of claim 1, further comprising an asset maintenance component, the asset maintenance component including a set of data acquisition devices configured to acquire the defect data during operation of the transportation asset and provide the defect data for processing by the computer system.

3. The system of claim 2, wherein the evaluating further includes periodically optimizing a configuration of the asset maintenance component to reduce the composite defect cost.

4. The system of claim 2, wherein the set of data acquisition devices includes a plurality of data acquisition devices that acquire the defect data using a plurality of modalities.

5. The system of claim 1, wherein the computer system is further configured to generate an invoice for the evaluating for a stakeholder corresponding to the transportation asset.

6. The system of claim 1, wherein the computing the composite cost includes at least one of: acquiring historic cost data for the defect from a stakeholder system or obtaining published cost data for the defect from a third party data source.

7. The system of claim 1, wherein the computing the composite cost includes cost savings resulting from at least one of: timely maintenance of the defect on the transportation asset or additional use of the asset beyond a predetermined safe use period.

8. The system of claim 1, wherein the analyzing includes fusing defect data acquired using a plurality of modalities.

9. The system of claim 1, wherein the periodically optimizing includes adjusting at least one threshold based on at least one of: an occurrence of a defect failure; or a false identification of the defect.

10. A system for managing a plurality of transportation assets, the system comprising:
    an asset maintenance component, the asset maintenance component including a set of data acquisition devices configured to acquire defect data during operation of the plurality of transportation assets;
    a computer system for managing operation of the plurality of transportation assets, the managing including:
        computing, for each defect of a set of defects monitored for the plurality of transportation assets, a composite defect cost corresponding to the defect, wherein the composite defect cost includes a combination of costs incurred by each of: acquiring defect data relating to the defect during operation of the plurality of transportation assets apart from costs of operating the plurality of transportation assets, addressing any instances of the defect, addressing any defect failure incidents, and processing any errors in identifying instances of the defect;
        periodically analyzing the defect data acquired by the asset maintenance component during operation of each of the plurality of transportation assets over a period of time to determine each of: current operability of each of the plurality of transportation assets with respect to the set of defects and a future requirement for maintenance on each of the plurality of transportation assets due to the defect;
        generating a set of actions for the plurality of transportation assets based on the analyzing; and
        periodically optimizing the system to reduce the composite defect cost, wherein the optimizing includes at least one of: reconfiguring the set of data acquisition devices; or adjusting a set of attributes of the analyzing, to reduce the composite defect cost and minimize a number of defect failure incidents.

11. The system of claim 10, wherein the reconfiguring includes:
  determining whether an attribute of the plurality of transportation assets is being monitored during use in a manner that can be adjusted to lower the composite defect cost; and
  adjusting at least one of: a configuration of the set of data acquisition devices or a frequency of use of at least one of the set of data acquisition devices to reduce the composite defect cost, in response to determining that the attribute of the plurality of transportation assets is being monitored during use in a manner that can be adjusted to lower the composite defect cost.

12. The system of claim 10, wherein the adjusting the set of attributes includes adjusting at least one threshold based on at least one of: an occurrence of a defect failure incident or a false identification of the defect.

13. The system of claim 10, wherein the managing further includes periodically generating an invoice for the managing for a stakeholder corresponding to the transportation asset.

14. The system of claim 13, wherein the managing further includes adjusting a billing model used to generate the invoice in response to the periodically optimizing.

15. The system of claim 10, wherein the set of actions includes adjusting a repair network capacity for the asset maintenance component based on the analyzing.

16. A system for managing a plurality of transportation assets for a stakeholder, the system comprising:
  an asset maintenance component, the asset maintenance component including a set of data acquisition devices configured to acquire defect data during operation of the plurality of transportation assets;
  a computer system for managing operation of the plurality of transportation assets, the managing including:
    evaluating the plurality of transportation assets during each operational day, the evaluating including:
      obtaining defect data acquired by the asset maintenance component during operation of the plurality of transportation assets;
      analyzing the defect data to determine each of: current operability of each of the plurality of transportation assets with respect to the set of defects and a future requirement for maintenance on each of the plurality of transportation assets due to the defect; and
      generating a set of actions for the plurality of transportation assets based on the analyzing; and
    optimizing the system after expiration of an optimization period, the optimizing including:
      computing, for each defect of a set of defects monitored for the plurality of transportation assets during the optimization period, a composite defect cost corresponding to the defect, wherein the composite defect cost includes a combination of costs incurred by each of: acquiring defect data relating to the defect during operation of the plurality of transportation assets apart from costs of operating the transportation asset, addressing any instances of the defect, addressing any defect failure incidents, and processing any errors in identifying instances of the defect; and
      optimizing the system to reduce a combined cost of the composite defect costs for the set of defects, wherein the optimizing includes at least one of: reconfiguring the set of data acquisition devices; or adjusting a set of attributes of the analyzing, to reduce the combined cost and minimize a number of defect failure incidents.

17. The system of claim 16, wherein the managing further includes periodically generating an invoice for the managing for the stakeholder.

18. The system of claim 17, wherein the managing further includes adjusting a billing model used to generate the invoice in response to the optimizing.

19. The system of claim 16, wherein the reconfiguring includes:
  determining whether an attribute of the plurality of transportation assets is being monitored during use in a manner that can be adjusted to lower the composite defect cost; and
  adjusting at least one of: a configuration of the set of data acquisition devices or a frequency of use of at least one of the set of data acquisition devices to reduce the composite defect cost, in response to determining that the attribute of the plurality of transportation assets is being monitored during use in a manner that can be adjusted to lower the composite defect cost.

20. The system of claim 3, wherein the periodically optimizing the configuration of the asset maintenance component includes:
  determining whether any of the plurality of transportation assets is being monitored during use in a manner that can be adjusted to lower the composite defect cost; and
  adjusting at least one of: a configuration of the set of data acquisition devices or a frequency of use of at least one of the set of data acquisition devices to reduce the composite defect cost, in response to determining that at least one of the plurality of transportation assets is being monitored during use in a manner that can be adjusted to lower the composite defect cost.

* * * * *